US008741797B2

(12) United States Patent
Reilly et al.

(10) Patent No.: US 8,741,797 B2
(45) Date of Patent: Jun. 3, 2014

(54) COMPOSITE BODY INCLUDING A NITRIDE MATERIAL, A CARBIDE MATERIAL, AND AN AMORPHOUS PHASE MATERIAL

(71) Applicants: Christopher J. Reilly, Whitinsville, MA (US); Vimal K. Pujari, Northborough, MA (US); Edmund A. Cortellini, North Brookfield, MA (US); David M. McElwee, Newark, DE (US)

(72) Inventors: Christopher J. Reilly, Whitinsville, MA (US); Vimal K. Pujari, Northborough, MA (US); Edmund A. Cortellini, North Brookfield, MA (US); David M. McElwee, Newark, DE (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 0 days.

(21) Appl. No.: 13/628,684

(22) Filed: Sep. 27, 2012

(65) Prior Publication Data
US 2013/0090228 A1 Apr. 11, 2013

Related U.S. Application Data

(60) Provisional application No. 61/541,693, filed on Sep. 30, 2011.

(51) Int. Cl.
*C04B 35/577* (2006.01)
*C04B 35/596* (2006.01)

(52) U.S. Cl.
USPC ............... 501/92; 501/89; 501/90; 501/97.2; 501/97.3; 501/97.4

(58) Field of Classification Search
USPC ...................... 501/89, 92, 80, 97.2, 97.3, 97.4
See application file for complete search history.

(56) References Cited

U.S. PATENT DOCUMENTS

| | | | |
|---|---|---|---|
| 3,950,464 A | 4/1976 | Masaki | |
| 4,004,937 A | 1/1977 | Masaki | |
| 4,025,351 A | 5/1977 | Masaki | |
| 4,533,646 A | 8/1985 | Wang et al. | |
| 5,053,363 A | 10/1991 | Brandt | |
| 5,352,641 A | 10/1994 | Matsui et al. | |
| 5,394,015 A | 2/1995 | Tsuzuki et al. | |
| 5,525,556 A * | 6/1996 | Dunmead et al. ............... | 501/92 |
| 5,575,571 A | 11/1996 | Takebayashi et al. | |
| 5,635,431 A | 6/1997 | Ikeda et al. | |
| 5,759,933 A | 6/1998 | Li et al. | |
| 5,855,841 A | 1/1999 | Trigg et al. | |
| 6,141,899 A | 11/2000 | Nakahori | |
| 6,458,732 B1 | 10/2002 | Doza et al. | |

(Continued)

FOREIGN PATENT DOCUMENTS

JP 5093388 A 4/1993

OTHER PUBLICATIONS

Mathias Herrmann et al., "Silicon Nitride/Silicon Carbide Nanocomposite Materials: I, Fabrication and Mechanical Properties at Room Temperature," Journal of the American Ceramic Society, vol. 81, Issue 5, dated 1998, pp. 1095-1108.

(Continued)

*Primary Examiner* — Karl Group
(74) *Attorney, Agent, or Firm* — Robert N. Young; Abel Law Group, LLP

(57) ABSTRACT

A composite article having a body including a first phase that includes a nitride material, a second phase that includes a carbide material, and a third phase having one of an amorphous phase material with a nitrogen content of at least about 1.6 wt % or an amorphous phase material comprising carbon.

19 Claims, 1 Drawing Sheet

(56) References Cited

U.S. PATENT DOCUMENTS

| | | | |
|---|---|---|---|
| 6,680,267 | B2 | 1/2004 | Pujari et al. |
| 6,762,140 | B2 | 7/2004 | Pujari et al. |
| 6,784,131 | B2 | 8/2004 | Komatsu et al. |
| 6,805,034 | B1 | 10/2004 | McCormick et al. |
| 7,056,850 | B2 | 6/2006 | Komatsu |
| 7,151,066 | B2 * | 12/2006 | Komatsu et al. ............... 501/92 |
| 7,294,596 | B2 * | 11/2007 | Esmaeilzadeh ............. 501/98.1 |
| 7,732,026 | B2 | 6/2010 | Bryden |
| 8,003,557 | B2 * | 8/2011 | Levoy et al. .................... 501/92 |
| 8,097,547 | B2 * | 1/2012 | Jorge et al. ..................... 501/92 |
| 2004/0191535 | A1 | 9/2004 | Komatsu |
| 2008/0093779 | A1 | 4/2008 | Cutler et al. |
| 2008/0234122 | A1 * | 9/2008 | Jorge et al. ..................... 501/92 |
| 2008/0282735 | A1 | 11/2008 | Sun |
| 2011/0008604 | A1 | 1/2011 | Boylan |
| 2011/0151192 | A1 | 6/2011 | Reilly et al. |
| 2012/0171463 | A1 | 7/2012 | Reilly et al. |

OTHER PUBLICATIONS

Flinders et al., "High-Toughness Silicon Carbide as Armor," Journal of the American Ceramic Society, vol. 88, Issue 8, dated Aug. 2005, pp. 2217-2226, Abstract Only <http://onlinelibrary.wiley.com/doi/10.111/j.1551-2916.2005.00415.x/full>, printed Aug. 18, 2011.

Soo Young Lee, "Fabrication of Si3N4/SiC Composite by Reaction-Bonding and Gas-Pressure Sintering," Journal of the American Ceramic Society, vol. 81, Issue 5, dated May 1998, pp. 1262-1268.

The International Search Report and the Written Opinion for International Application No. PCT/US2012/057491 received from the International Searching Authority (ISA/KR), dated Feb. 14, 2013, 10 pages.

Zymla et al. "Oxidation of silicon nitride bonded silicon carbide refractory material in air and carbon dioxide" 2001, 5 pgs.

* cited by examiner

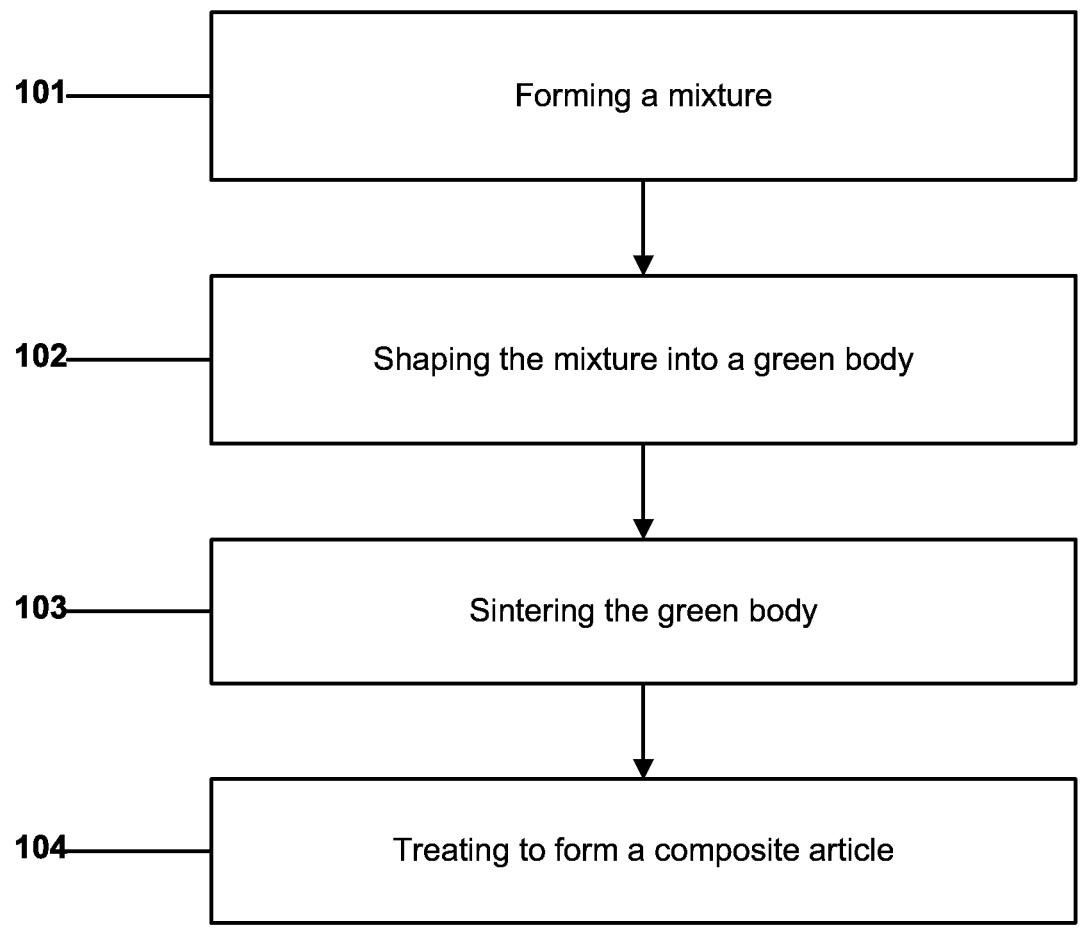

US 8,741,797 B2

COMPOSITE BODY INCLUDING A NITRIDE MATERIAL, A CARBIDE MATERIAL, AND AN AMORPHOUS PHASE MATERIAL

CROSS-REFERENCE TO RELATED APPLICATION(S)

The present application claims priority from U.S. Provisional Patent Application No. 61/541,693, filed Sep. 30, 2011, entitled "Composite Body and Method of Making," naming inventors Christopher J. Reilly et al., which application is incorporated by reference herein in its entirety.

BACKGROUND

1. Field of the Disclosure

The following is directed to composite articles, and particularly, composite articles comprising reaction bonded silicon carbide bodies.

2. Description of the Related Art

Various composite materials are commercially available, including certain ceramic composite bodies incorporating silicon carbide. Silicon carbide-based ceramic materials have been utilized in many applications for their refractory properties and mechanical properties. Among the types of silicon carbide-based ceramics available, various types exist based on the particular forming process, including for example, sintered silicon carbide, hot pressed silicon carbide, and recrystallized silicon carbide. Each of the various types of silicon carbide bodies can have distinct features. For example, sintered silicon carbide (such as Hexoloy®) can be a very dense material, but is generally expensive and complex to produce. On the other hand, more cost effective but relatively porous silicon carbide materials such as nitride-bonded silicon carbide (known by acronyms such as NBSC and NSIC) have found practical use in refractory applications. Such refractory components include furnace or kiln furniture utilized in connection with holding or supporting work pieces during firing operations, as well as refractory lining materials.

Nitride-bonded silicon carbide tends to be a comparatively porous material, oftentimes having a porosity within a range of about 10 to about 15 vol %. These components are manufactured from a green body containing silicon carbide and silicon, and sintering the green body in a nitrogen containing atmosphere at temperatures on the order of 1,500° C. While nitride-bonded silicon carbide has desirable high temperature properties, it unfortunately suffers from poor oxidation resistance when used in oxidizing conditions, due in part to its intrinsic porosity. This particular characteristic has been addressed in the past by re-firing nitride-bonded silicon carbide components in an oxidizing atmosphere to form a thin oxide layer of amorphous or glassy silica, which functions to passivate and seal the outer surface of the component. Other techniques have focused on forming an outer, protective layer by firing a glass former, such as a silica-containing coating or a silica precursor, which is coated on the component. However, unfortunately, such processing pathways tend to form porous layers that have a propensity to crack and spall during use, rendering the outer protective layer of limited effectiveness.

In view of the state of the art of silicon carbide-based materials, there is a need in the art for improved composites.

SUMMARY

According to one aspect, a composite article has a body including a first phase comprising a nitride material, a second phase comprising a carbide material, and a third phase comprising a least one of a first amorphous phase portion having a nitrogen content of at least about 1.6 wt % and a second amorphous phase portion comprising carbon.

According to another aspect, a composite article includes a body including a first phase comprising a nitride material, a second phase comprising a carbide material, and a third phase comprising an amorphous phase material having a nitrogen content of at least about 1 wt % contained within the amorphous phase material.

In yet another aspect, a composite article includes a body including a first phase comprising a nitride material, a second phase comprising a carbide material, and a third phase comprising an amorphous phase carbon material.

In still another aspect, a composite article includes a body including a first phase comprising a nitride material, a second phase comprising a carbide material, a third phase comprising a amorphous phase material, and wherein the body comprises a nitrogen content in excess of a stoichiometric amount of nitrogen associated with the nitride material.

According to one particular aspect, a composite article includes a body having a first phase comprising a nitride material, a second phase comprising a carbide material, a third phase comprising an amorphous phase carbon material, and wherein the body comprises a carbon content in excess of a stoichiometric amount of carbon associated with the carbide material.

In another particular aspect, a method for forming a composite article includes forming a green body comprising a first phase comprising a silicon material and a second phase comprising a carbide material. The method further includes treating after forming to convert a portion of the carbide material of the second phase to a nitride material.

Another aspect of the present application includes a method for forming a composite article including forming a green body comprising a first phase comprising a silicon material, a second phase comprising a carbide material, and a third phase comprising an oxide material. The method further includes sintering the green body to form a first phase comprising a nitride material and treating after sintering to form a composite body having a nitrogen content in excess of a stoichiometric amount of nitrogen associated with the nitride material.

In yet another aspect, a method for forming a composite article includes forming a green body comprising a first phase, a second phase comprising a carbide material, and a third phase comprising an oxide material. The method further includes pressing the body in an atmosphere comprising a nitrogen pressure of at least about 6 MPa (59 atm) and transforming a portion of the carbide material of the second phase to a nitride material.

According to still another aspect, a method for forming a composite article includes forming a green body comprising a first phase, a second phase comprising a carbide material, and a third phase comprising an oxide material. The method further includes pressing the body in an atmosphere comprising a nitrogen pressure of at least about 6 MPa (59 atm) and transforming a portion of the carbide material of the second phase to a free carbon material.

BRIEF DESCRIPTION OF THE DRAWINGS

The present disclosure may be better understood, and its numerous features and advantages made apparent to those skilled in the art by referencing the accompanying drawings.

FIGURE includes a flow chart illustrating a method of forming a composite article in accordance with an embodiment. As illustrated, the process can be initiated at step 101 by forming a mixture. In accordance with an embodiment, the mixture may be a dry mixture or wet mixture. In particular instances, the mixture can be a wet mixture including a liquid carrier, which may be an organic material, and more particularly, an aqueous-based material (e.g., water or deionized water).

The use of the same reference symbols in different drawings indicates similar or identical items.

DETAILED DESCRIPTION

The following is directed to a composite article including multiple phases of materials, which may be utilized in various capacities, including for example armor applications, and more particularly body armor and/or vehicle armor systems intended to thwart various projectile-based threats.

FIG. 1 includes a flow chart illustrating a method of forming a composite article in accordance with an embodiment. As illustrated, the process can be initiated at step 101 by forming a mixture. In accordance with an embodiment, the mixture may be a dry mixture or wet mixture. In particular instances, the mixture can be a wet mixture including a liquid carrier, which may be an organic material, and more particularly, an aqueous-based material (e.g., water or deionized water).

The mixture can include raw materials suitable for creating various phases in the finally-formed composite article. For example, a first raw material including a carbide material can be added to the mixture. The carbide material may be in the form of a powder having an average particle size (D50) within a range between about 0.5 microns and about 200 microns. In particular instances, the carbide material can be a mixture of two different raw material powder materials, wherein the first powder can be a fine powder having an average particle size within a range between about 0.5 microns and about 20 microns, and the second powder can be a coarse powder having an average particle size within a range between about 50 microns and about 150 microns.

In one particular instance, the carbide material can include silicon, and more particularly, can include silicon carbide. In accordance with one embodiment, the first raw material can consist essentially of silicon carbide.

The mixture can be formed such that the first raw material including the carbide powder material forms the majority content of the powder components within the mixture. For example, the carbide material can be present in amounts of at least about 50 wt %, at least about 55 wt %, at least about 58 wt %, at least about 60 wt %, or even at least about 63 wt %. Still, in certain instances, the carbide powder material may be present in an amount of not greater than about 95 wt %, such as not greater than 90 wt %, not greater than 88 wt %, or even not greater than about 85 wt %. It will be appreciated that the carbide raw material can be present in amounts within range between any of the minimum and maximum percentages provided above. Furthermore, it will be appreciated that the carbide raw material can be present in amounts within range between any of the minimum and maximum percentages provided above.

The mixture may further include a second raw material different than the first raw material. The second raw material can be a powder material comprising silicon. For example, in one embodiment, the raw material including silicon can be a silicon-based powder, and more particularly, may be pure silicon powder, such that it is 99.9% pure silicon.

According to one embodiment, the second raw material powder can have an average particle size less than the average particle size of the first raw material powder. For example, the second raw material powder can have an average particle size (D50) within a range between about 20 microns and about 60 microns.

Furthermore, the second raw material powder may be present in minority contents, and more particularly, in an amount less than the first raw material. For example, the second raw material powder may be present in an amount of not greater than about 30 wt %, such as not greater than about 28 wt %, not greater than about 25 wt %, not greater than about 22 wt %, or even not greater than 20 wt % for the total weight of the powder components within the mixture. Still, in particular instances, the second raw material powder may be present within the mixture in an amount of at least 2 wt %, such as at least about 5 wt %, at least about 7 wt %, at least about 10 wt %, or even at least about 12 wt % for the total weight of the dry components within the mixture. It will be appreciated that the second raw material powder can be present in an amount within a range between any of the minimum and maximum of the percentages noted above.

The mixture may further contain a raw material additive or third raw material powder. The additive may in the form of an oxide. In particular instances, the additive can include alumina. Furthermore, in other instances, the additive may include magnesium. In one particular instance, the raw material additive can be an oxide material including alumina and magnesium. For example, the raw material additive can be a spinel-containing material (e.g., $MgAl_2O_4$), which may form a glassy (i.e., amorphous) phase in the finally-formed body.

According to one embodiment, the mixture can contain a particular amount of the raw material additive. For example, the raw material additive powder may be present in minority contents within the mixture, and more particularly, in an amount less than the first raw material, and in an amount less than the second raw material. For example, the raw material additive powder may be present in an amount of not greater than about 20 wt %, such as not greater than about 15 wt %, not greater than about 12 wt %, not greater than about 10 wt %, or even not greater than 8 wt % for the total weight of the powder components within the mixture. Still, in particular instances, the raw material additive powder may be present within the mixture in an amount of at least 4 wt %, such as at least about 5 wt %, at least about 6 wt % for the total weight of the dry components within the mixture. It will be appreciated that the raw material additive powder can be present in an amount within a range between any of the minimum and maximum of the percentages noted above. It will also be appreciated that the total amount of all of the powder components can add up to be 100%.

The additive material powder can have an average particle size that can be less than or greater than an average particle size of the first raw material powder. Additionally, the additive material powder can have an average particle size that can be less than or greater than an average particle size of the second raw material powder. Moreover, the additive material powder can have an average particle size (D50) that is within a range between about 10 microns and about 50 microns.

After suitably forming the mixture at step 101, the process can continue at step 102 by shaping the mixture into a green body. Various shaping process can be undertaken including for example pressing, extruding, casting, punching, and a combination thereof. Notably, in one instance, the mixture can be a wet mixture that is shaped into a green body via a slip casting process. Furthermore, after appropriately shaping the mixture, the green body can be dried.

After suitably forming the green body at step 102, the process can continue at step 103 by sintering the green body. The sintering process may be conducted at elevated temperatures and facilitate densification of the green body. Sintering may also facilitate grain growth of certain phases. In accordance with an embodiment, the sintering process can be conducted at a temperature of at least about 1200° C., such as at least about 1250° C., at least about 1300° C., or even at least about 1325° C. Still, the sintering process can be conducted at a temperature of not greater than about 1600° C., such as not greater than about 1500° C. It will be appreciated that the sintering process can be conducted at a temperature within a range between any of the minimum and maximum temperatures noted above.

Typically, the green body is sintered to a temperature for a time period of at least 2 hours, and more particularly between about 2 to about 20 hours, depending upon the size of the body and the thickness of the wall of the body. Particular embodiments may be heat treated in a nitrogen-containing atmosphere for longer durations, such as at least 1 to 2 days. Sintering the body in the nitrogenous atmosphere can be effective to facilitate a reaction between the silicon material contained in the body and the nitrogen atmosphere, causing the formation of silicon nitride. The silicon nitride can be present within the fired body as a secondary phase, which bonds the primary silicon carbide phase.

The sintering process may be conducted in a particular atmosphere. For example, sintering can be conducted in an ambient atmosphere. However, in more particular instances, sintering can be conducted in a reducing atmosphere, and even more particularly in a nitrogen-rich atmosphere. Such a process can facilitate nitridization of certain materials in the green body and facilitate the formation of a silicon nitride-bonded silicon carbide body. In one particular instance, the sintering process can be conducted in an atmosphere comprising at least about 60% nitrogen, such as at least about 70% nitrogen, or even at least about 90% nitrogen. In fact, the sintering atmosphere can consist essentially of nitrogen.

Sintering may further be conducted in a particular pressure. For example, the pressure during sintering may be not greater than about 5 MPa, such as not greater than about 4 MPa, or even not greater than about 3.5 MPa. Still, the pressure utilized during sintering can be at least about 0.01 MPa, or even at least about 0.08 MPa.

Optionally, after sintering, the body can be formed, including removal of particular compositions and portions of the body of the fired article. In particular, forming can include removal of unwanted features and compositions from the external surfaces of the sintered body since the heat treatment may result in a fired article having a "furry" external surface. Various methods can be undertaken to shape the fired article, including, for example, sand blasting, grinding, and other abrasive techniques.

After forming, another optional process of oxidation can be conducted. The sintered body can be heat treated in an oxidizing atmosphere for a particular duration to facilitate the formation of a skin layer of oxide material on the surface of the body. Generally, such oxidation processes utilize temperatures within a range between about 1300° C. and about 1600° C., for durations between about 1 hour and about 20 hours.

After sintering the green body at step 103, the process can continue at step 104 by treating the body to form a composite article. In accordance with an embodiment, the process of treating can include a high-pressure treatment. The high-pressure treatment can include encapsulation of the sintered body in a high-pressure atmosphere, including for example gas-pressure sintering (GPS), hot-isostatic pressing (HIP), or a glass encapsulated hot-isostatic pressing (GEH). In fact, treating can be conducted at a pressure that is greater than the pressure utilized during sintering. For example, the pressure utilized during treating can be at least about 6 MPa, such as at least about 10 MPa, at least about 20 MPa, at least about 40 MPa, at least about 50 MPa, at least about 70 MPa, at least about 80 MPa, at least about 90 MPa, or even at least about 100 MPa. Still, in one embodiment, the high-pressure treatment can utilize a pressure of not greater than about 300 MPa.

In addition to the high-pressure treatment, the treating process may also utilize a particular atmosphere, which can facilitate a transformation of certain phases within the sintered body. For example, treating can be conducted in a nitrogen-rich atmosphere. More particularly, treating may be conducted in an atmosphere comprising at least about 60% nitrogen, such as at least about 70% nitrogen, at least about 80% nitrogen, at least about 90% nitrogen, or even an atmosphere consisting essentially of nitrogen.

Furthermore, treating can be conducted at elevated temperatures which can facilitate a transformation. In fact, treating may be conducted at temperatures that are greater than the temperature utilized for sintering. For example, the treating process can be conducted at a temperature of at least about 1200° C., such as at least about 1300° C., at least about 1350° C., or even at least about 1400° C. Still, the treating process may be conducted at a temperature that is not greater than about 2400° C., such as not greater than about 2300° C., not greater than about 2200° C., or even not greater than about 2100° C. During the treating process, the temperature can be maintained for a duration of at least about 10 minutes, at least about 30 minutes, or even at least about 50 minutes. In other instances, the temperature can be maintained for a duration of not greater than about 10 hours.

Conducting such a treating operation may facilitate inclusion of excess nitrogen into the body from the high-temperature, high-pressure, nitrogen atmosphere. Accordingly, the body can have a nitrogen content that is in excess of a stoichiometric amount of nitrogen that would typically be associated with a single nitride phase within the composite body. In more particular instances, the treating process can be conducted at such high pressures that the body is pressed facilitating a transformation of a portion of a carbide material to a nitride material within the composite body. For example, the treating process can be conducted to facilitate a decomposition reaction of silicon carbide to silicon nitride as represented by the chemical equation: $3SiC(s)+2N_2(g) \rightarrow Si_3N_4(s)+3C(s)$. Furthermore, the treatment process can facilitate a consumption reaction in the body, wherein a content of silica in the body can be converted to silicon nitride, as represented by the chemical equation $2SiC(s)+SiO_2(s)+2N_2(g) \rightarrow Si_3N_4(s)+2CO(g)$.

The resulting composite article formed from the process can have a body including a first phase, a second phase, and a third phase, which are distinct from each other. In accordance with an embodiment, the first phase can include a nitride material. In fact, the first phase may include silicon, and more particularly include silicon nitride. In accordance with one embodiment, the first phase can consist essentially of the silicon nitride.

The silicon nitride of the first phase may be a mix of alpha and beta phases of silicon nitride. Typically, however, the silicon nitride of the first phase comprises a minority content of alpha phase and a majority content of beta phase silicon nitride. In more particular instances, the silicon nitride of the first phase can have an alpha phase silicon nitride content of less than about 35%, such as not greater than about 30%, not greater than about 25%, or even not greater than about 10% for the total amount of silicon nitride. In particular instances, the body can be essentially beta phase silicon nitride. For example, the body can contain at least about 99% beta phase silicon nitride.

Additionally, the first phase can be made of grains having an average grain size of not greater than about 10 microns, such as not greater than about 8 microns, not greater than about 5 microns, not greater than about 3 microns, or even not greater than about 1 micron. Still, the first phase can include grains having an average grain size of at least about 0.01 microns, such at least 0.05 microns, at least about 0.08 microns or at least about 0.1 microns. It will be appreciated that the first phase can have an average grain size within a range between any of the minimum and maximum values noted above.

Furthermore, the first phase can be made of crystalline grains having acicular or needle-like morphology. In particular, the crystalline grains of the first phase may have an aspect ratio measured as length:width, wherein the length is the longest measurement of the grain and the width is the shortest measurement of the grain. The crystalline grains of the first phase can have an aspect ratio within a range between about 1 to 10, and more particularly, within a range between 2 to 6.

In accordance with an embodiment, the body of the composite article can be formed such that the first phase including silicon nitride is present in a majority amount. That is, for example, the first phase can be present in an amount greater than the second phase. Additionally, the first phase can be present in an amount greater than the third phase. For example, the body can be formed to have a content of the first phase that is at least about 50 wt %, such as at least about 55 wt %, at least about 60 wt %, or even at least about 65 wt %. Still, the body may be formed such that the first phase is present in an amount that is not greater than about 90 wt %, such as not greater than about 85 wt %, not greater than about 80 wt %, not greater than about 80 wt %, not greater than about 75 wt %, or even not greater than about 70 wt % for the total weight of the body. It will be appreciated that the amount of the first phase within the body can be within a range between any of the minimum and maximum values noted above.

The composite article can further include a second phase including a carbide material. In particular instances, the second phase can include silicon carbide, and more particularly, may consist essentially of silicon carbide.

In accordance with an embodiment, the second phase can be present as a crystalline material made of crystallites or grains, which may be bonded together by the material of the first phase. The second phase can have grains having an average grain size of not greater than about 500 microns, such as not greater than about 300 microns, not greater than about 200 microns, or even not greater than about 150 microns. Still, the second phase can include grains having an average grains size that is at least about 0.1 microns, at least about 0.5 microns, at least about 1 micron, at least about 5 microns, at least about 10 microns, at least about 12 microns, at least about 20 microns, or even at least about 50 microns. It will be appreciated that the second phase can have grains having an average grain size within a range between any of the minimum and maximum values provided above.

In accordance with an embodiment, the composite article can be a body having a particular amount of the second phase including silicon carbide. For example, the body can include a minority content of the second phase, including for example not greater than about 45 wt %, such as not greater than about 40 wt %, not greater than about 35 wt %, not greater than about 30 wt %, not greater than about 25 wt %, not greater than about 22 wt %, or even not greater than about 20 wt % of the second phase for the entire weight of the body. Still, in one particular embodiment, the second phase may be present within the body in an amount of at least about 5 wt %, at least about 8 wt %, at least about 10 wt %, or even at least about 12 wt % for the total weight of the body. It will be appreciated that the second phase can be present within the body in an amount within a range between any of the minimum and maximum percentages noted above.

The grains of the second phase may include an alpha phase of silicon carbide. More particularly, the second phase can be formed of acicular or needle-like grains having an aspect ratio of length:width, wherein length is the longest measurement and the width is the shortest measurement of the grain as viewed in cross-section through suitable means (e.g., SEM). The grains of the second phase can have an aspect ratio within a range between 1 and 20, such as within a range between 1 and 15, and more particularly, within a range between 2 to 10.

In accordance with an embodiment, the composite article may be formed to have a body having a particular ratio between the content of the first phase and content of the second phase. As noted herein, the body may be formed to have a greater content of the first phase as compared to the content of the second phase. And more particular instances, the body can have a ratio of the content of first phase to second phase that is at least about 3:1, such as at least about 3.2:1, at least about 3.5:1, or even 4:1. Still, the body may utilize a ratio of first phase to second phase (i.e., wt % second phase: wt % first phase) that is not greater than about 10:1, not greater than about 9:1, not greater than about 8:1 or not greater than about 7:1.

The composite article can further include a third phase separate and distinct from the first or second phase. The third phase can include a first portion and/or a second portion, wherein the first portion and second portion can be distinct from each other in morphology, composition, position with the body, and a combination thereof. In one embodiment, the body can include a third phase having a content of the first portion and the second portion. In a more particular instance, the body can contain a greater content of the first portion than a content of the second portion.

According to one embodiment, the first portion of the third phase can include an oxide material. In particular instances, the first portion of the third phase can include an amorphous phase material. The first portion can include certain elemental species, such as aluminum, magnesium, yttrium, and a combination thereof. For example, in one embodiment, the third phase can include a magnesium, aluminum oxide material, and more particularly, can consist essentially magnesium, aluminum oxide material. In other embodiments, the first portion of the third phase can include an amorphous phase material including yttrium and aluminum, such as a yttrium, aluminum oxide material. According to a particular embodiment, the first portion of the third phase can consist essentially of a yttrium, aluminum oxide material.

In certain embodiments, the first portion and/or second portion of the third phase can be dispersed within the matrix of the first phase and the second phase, and may be uniformly dispersed throughout the entire volume of the body. In particular instances, the first portion and/or the second portion of the third phase can be located between grains of the first phase and second phase, such as at the grain boundaries. More particularly, the first portion and/or the second portion of the third phase material may have a different morphology than the first phase or second phase. For example, the first portion and/or the second portion of the third phase can include an amorphous phase material (i.e., glassy phase). In fact, in certain instances, the third phase can consist essentially of an amorphous material, such that the third phase is essentially free of crystalline content.

According to one aspect, the third phase can be present in a minority amount within the body. For example, the body can have a content of first phase that is greater than the content of the third phase including the total amount of the first portion and the second portion. Moreover, the body can be formed such that the content of the second phase is greater than the third phase including the total amount of the first portion and the second portion. In particular instances, the body can be formed such that the content of the third phase can be at least about 4 wt %, such as at least about 5 wt %, or at least about 6 wt % for the total weight of the body. However, in one embodiment the composite article is formed such that the body has not greater than about 20 wt %, such as not greater than about 15 wt %, not greater than about 12 wt %, not greater than about 11 wt % the third phase for the total weight of the body. It will be appreciated that the amount of the third phase within the body can be within a range between any of the minimum and maximum values noted above.

In accordance with another embodiment, the composite article can be formed such that the first portion of the third phase contains a particular content of nitrogen due to particular process techniques according to the embodiments. For example, the first portion of the third phase can include a nitrogen content of at least about 1.6 wt %, at least about 1.8 wt %, at least about 2.0 wt %, at least about 2.2 wt %, at least about 2.5 wt %, or even at least about 2.8 wt % of the total weight of the body. However, in another embodiment, the first portion of the third phase may be formed such that it has a nitrogen content of not greater than about 10 wt %, not greater than about 9 wt %, not greater than about 8 wt %, not greater than about 7 wt %, not greater than about 6 wt %, not greater than about 5 wt %, or even not greater than about 4 wt % for the total weight of the body. It will be appreciated the first portion of the first portion of the third phase can be formed to have a nitrogen content within a range between any of the minimum and maximum values noted above.

Furthermore, it will be appreciated that the above nitrogen content within the first portion of the third phase can be substantially the same as, or essentially the same as, the excess nitrogen content within the body due to a non-stoichiometric amount of nitrogen. The non-stoichiometric amount of nitrogen, which is an amount of nitrogen in excess of a calculated stoichiometric amount based on nitrogen expected to be present in the body as part of the first phase comprising the nitride material. In particular instances, a portion of the excess nitrogen within the body can be contained within the first portion of the third phase. In certain other instances, a majority content of the excess amount of nitrogen can be present within the first portion of the third phase, and even more particularly, essentially all of the excess nitrogen within the body can be present within the first portion of the third phase.

In further detail, the amount of excess nitrogen content can be calculated from analytical data. For example, the sample can be first examined under x-ray diffractometry using the Reitveld method on a Philips powder diffractometer to calculate the amount of nitrogen contained within the crystalline structure of the material. A sample of the body can further be evaluated using a TC600 machine made by LECO following the standard procedures for measuring nitrogen content within a sample. The excess nitrogen is then the difference between the nitrogen content calculated purely from the crystalline content and the nitrogen content measured using the TC600 machine, which can measure nitrogen content independent of phase (i.e., amorphous or crystalline).

Additionally, the body can include a non-stoichiometric amount of carbon, which is an amount of carbon in excess of a calculated stoichiometric amount based on the amount of carbon expected to be present in the body as part of the second phase comprising the carbide material. In particular instances, a portion of the excess carbon within the body can be contained within the second portion of the third phase. In certain other instances, a majority content of the excess content of carbon can be present within the second portion of the third phase, and even more particularly, essentially all of the excess carbon within the body can be present within the second portion of the third phase.

In accordance with another embodiment, the composite article can be formed such that the second portion of the third phase contains a particular content of carbon due to particular process techniques according to the embodiments. For example, the second portion of the third phase can include a carbon content of at least about 0.5 wt %, such as at least about 1 wt %, at least about 1.5 wt %, at least about 2.0 wt %, at least about 2.5 wt %, at least about 3 wt %, or even at least about 3.5 wt % of the total weight of the body. However, in another embodiment, the second portion of the third phase may be formed such that it has a carbon content of not greater than about 10 wt %, not greater than about 9 wt %, not greater than about 8 wt %, not greater than about 7 wt %, not greater than about 6 wt %, or even not greater than about 5 wt %. It will be appreciated the second portion of the third phase can be formed to have a carbon content within a range between any of the minimum and maximum values noted above.

In an embodiment, the above-referenced carbon content within the second portion of the third phase can be substantially the same as, or essentially the same as, the excess carbon content within the body due to a non-stoichiometric amount of carbon. The non-stoichiometric amount of carbon, which is an amount of carbon in excess of a calculated stoichiometric amount based on the amount of carbon expected to be present in the body as part of the second phase comprising a carbide material. In particular instances, a portion of the excess carbon within the body can be contained within the second portion of the third phase. In certain other instances, a majority content of the excess amount of carbon can make up the second portion of the third phase, and even more particularly, essentially all of the excess carbon within the body can be present within the second portion of the third phase. The amount of excess carbon content can be calculated in the same manner as the calculation of excess nitrogen, except a CS600 model of the LECO machine is used.

In certain instances, the body of the composite article can be formed to have a particular content of yttrium (Y). For example, the body can include a content of yttrium of at least about 0.01 wt %, such as at least 0.05 wt %, or even at least 0.08 wt %, at least about 0.1 wt %, at least about 0.5 wt %, or even at least about 1 wt % for the total weight of the body. However, the content of yttrium may be limited such that the body contains not greater than about 10 wt %, such as not greater than about 9 wt %, not greater than about 7 wt %, not greater than about 5 wt %, or even not greater than about 3 wt % yttrium for the total weight of the body. The amount of yttrium within the body can be within a range between any of the above minimum and maximum percentages.

Additionally, the body may be formed to have a particular content of other particular elements. For example, the body may be essentially free of titanium (Ti), zirconium (Zr), hafnium (Hf), tungsten (W), molybdenum (Mo), tantalum (Ta), niobium (Ni), chromium (Cr).

Moreover, the body can be essentially free of metal silicon. In another embodiment, the body may contain a content of iron (Fe), such as a minority content of iron, typically not greater than about 5 wt %, not greater than about 3 wt %, or not greater than about 1 wt % for the total weight of the body. In a particular instance, the body can contain at least about 0.05 wt % iron, at least about 0.1 wt % iron, or at least about 0.5 wt % iron. The content of iron can be within a range between any of the minimum and maximum percentages noted above.

The composite article of the embodiments herein can be formed through a particular process including particular composition such that it has certain properties. For example, the composite articles can be formed to have a body having a hardness of at least about 10 GPa, at least about 11 GPa, or even at least about 12 GPa as measured via ASTM C1324 on the Vickers Hardness scale. Still, in certain instances, the body can have a hardness of not greater than about 19 GPa or not greater than about 18 GPa. It will be appreciated that the body can have a hardness within a range between any of the minimum and maximum values noted above.

Furthermore, the composite articles of the embodiments herein can be formed in the shape of a body having a fracture toughness (K1c) of at least about 4 Mpa m$^{(1/2)}$, at least about 4.5 MPa m$^{(1/2)}$, or even at least about 5 MPa m$^{(1/2)}$, as measured via indentation test on the K1c scale according to Anstis et al., Jour. Am. Cer. Soc., Vol. 64., pp. 533 (1981). Still, in certain instances, the body can have a hardness of not greater than about 7 MPa m$^{(1/2)}$ or not greater than about 6.8 MPa m$^{(1/2)}$. It will be appreciated that the body can have a fracture toughness within a range between any of the minimum and maximum values noted above.

Additionally, the body formed of the composite article according to the processes herein can have a particular density. For example, the density can be at least about 95%, such as at least about 97%, or even at least about 99% theoretical density. More particularly, the actual value of density can be within a range between about 2.6 g/cm$^3$ and about 3.3 g/cm$^3$.

EXAMPLE

A mixture of raw material powders of silicon metal, silicon carbide, and spinel frit is made. The dry mixture includes about 16.3 wt % silicon metal powder having a D50 particle size of approximately 25 microns, approximately 74.5 wt % total silicon carbide powder, wherein about half of the silicon carbide powder is a coarse powder having a D50 particle size of about 120 microns, and the other half of the silicon carbide powder is a fine powder having a D50 particle size of approximately 3 microns. The remainder of the mixture (~8.7 wt %) is made of the spinel powder material having a D50 particle size of about 10 microns.

The mixture is made into a slurry and slip-cast into a green body having the desired shape. The green body is sintered in an atmosphere of approximately 100% nitrogen at a pressure of approximately 0.1 MPa at a temperature of 1450° C. for about 10-12 hours. After sintering, the body is a nitrogen-bonded silicon carbide body.

The sintered body is then subject to a gas pressure hot isostatic pressing (GPH) operation in a nitrogen-rich atmosphere, at a pressure of approximately 200 MPa, for a duration of 1 hour, at a temperature of approximately 1800° C.

The finally formed composite material has approximately 56 wt % silicon nitride, 35 wt % silicon carbide, 8 wt % of a first portion of a third phase made of magnesium, aluminum oxide material (100% amorphous phase) having approximately 1.6 wt % non-stoichiometric nitrogen and approximately 3 wt % of a second portion of an amorphous third phase made of non-stoichiometric, amorphous phase carbon. The body was tested and demonstrated a Rockwell Hardness of 91 (Vickers Hardness of 11 GPa) and a fracture toughness (K1c) of 4.4 MPa m$^{(1/2)}$.

The embodiments herein are directed to composite articles incorporating silicon carbide, silicon nitride, and an oxide material having particular compositional and mechanical features making the article suitable for use in armor. The embodiments herein are directed to a combination of features including the percentages of particular phases within the body, size of grains within the body, presence of non-stoichiometric species, dispersion of the phases, absence of certain materials (i.e., elements and/or compounds), and others that represent a departure from the state of the art. The embodiments provide a combination of features, which can be combined in various manners to describe and define the bonded abrasive articles of the embodiments. The description is not intended to set forth a hierarchy of features, but different features that can be combined in one or more manners to define the invention.

In the foregoing, reference to specific embodiments and the connections of certain components is illustrative. It will be appreciated that reference to components as being coupled or connected is intended to disclose either direct connection between said components or indirect connection through one or more intervening components as will be appreciated to carry out the methods as discussed herein. As such, the above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

The disclosure is submitted with the understanding that it will not be used to interpret or limit the scope or meaning of the claims. In addition, in the foregoing disclosure, various features may be grouped together or described in a single embodiment for the purpose of streamlining the disclosure. This disclosure is not to be interpreted as reflecting an intention that the embodiments herein limit the features provided in the claims, and moreover, any of the features described herein can be combined together to describe the inventive subject matter. Still, inventive subject matter may be directed to less than all features of any of the disclosed embodiments.

What is claimed is:

1. A composite article comprising:
   a body including:
   a first phase comprising a nitride material;
   a second phase comprising a carbide material, wherein the first phase is present in an amount greater than the second phase; and
   a third phase comprising a first amorphous phase portion that comprises a magnesium, alumina oxide material, wherein the body comprises a nitrogen content in excess of a stoichiometric amount of nitrogen associated with the nitride material.

2. The composite article of claim 1, wherein the first phase comprises silicon nitride.

3. The composite article of claim 1, wherein the first phase comprises a crystalline material comprising grains and wherein the grains have an average grain size of not greater than about 10 microns.

4. The composite article of claim 1, wherein the second phase comprises silicon carbide.

5. The composite article of claim 1, wherein the second phase comprises a crystalline material comprising grains, and wherein the grains have an average grain size of not greater than about 500 microns.

6. The composite article of claim 1, wherein the body comprises a greater content of the first phase than a content of the third phase, and wherein the body comprises a greater content of the second phase than the content of the third phase.

7. The composite article of claim 1, wherein the body comprises not greater than about 20 wt % of the third phase.

8. The composite article of claim 1, wherein the first amorphous phase portion of the third phase is located between crystalline grains of the first phase and crystalline grains the second phase, and wherein a second amorphous phase portion of the third phase is located between crystalline grains of the first phase and crystalline grains of the second phase.

9. The composite article of claim 1, wherein the first amorphous phase portion of the third phase comprises a nitrogen content of not greater than about 10 wt % for the total weight of the body.

10. A composite article comprising:
a body including:
a first phase comprising a nitride material;
a second phase comprising a carbide material, wherein the first phase is present in an amount greater than the second phase; and
a third phase comprising amorphous carbon,
wherein the body comprises a nitrogen content in excess of a stoichiometric amount of nitrogen associated with the nitride material.

11. The composite article of claim 1, wherein a second amorphous phase portion of the third phase comprises a carbon content of at least about 0.5 wt % of the total weight of the body.

12. The composite article of claim 1, wherein the body comprises a hardness of at least about 10 GPa.

13. The composite article of claim 1, wherein the body comprises a fracture toughness (K1c) of at least about 4 $MPam^{(1/2)}$.

14. The composite article of claim 1, wherein the amount of nitrogen is at least about 1.6 wt % greater than a stoichiometric amount associated with the nitride material.

15. The composite article of claim 1, wherein the body has a theoretical density of at least 95%.

16. The composite article of claim 1, wherein the body is essentially free of titanium, zirconium, hafnium, tungsten, molybdenum, tantalum, niobium, chromium, or any combination thereof.

17. The composite article of claim 1, wherein the body is essentially free of titanium, zirconium, hafnium, tungsten, molybdenum, tantalum, niobium, and chromium.

18. The composite article of claim 1, wherein the body comprises iron at a content in a range of 0.05 wt % to 5 wt %.

19. A composite article comprising:
a body including:
a first phase consisting essentially of silicon nitride;
a second phase consisting essentially of silicon carbide, wherein the first phase is present in an amount greater than the second phase; and;
a third phase comprising amorphous phase material, wherein:
a first amorphous phase portion of the third phase comprises aluminum, magnesium, yttrium, or any combination thereof; and
a second amorphous phase portion of the third phase that includes essentially all excess carbon within the body,
wherein the body comprises a nitrogen content in excess of a stoichiometric amount of nitrogen associated with the nitride material.

* * * * *